US012793584B2

(12) United States Patent
Ha et al.

(10) Patent No.: US 12,793,584 B2
(45) Date of Patent: Nov. 10, 2026

(54) ELECTRONIC DEVICE

(71) Applicant: Samsung Display Co., Ltd., Yongin-si (KR)

(72) Inventors: Seunghwa Ha, Cheongju-si (KR); Sangjae Kim, Seongnam-si (KR); Hyeong-Jun Kim, Suwon-si (KR); Seung-Ho Jung, Hwaseong-si (KR); In-Woo Jeong, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 149 days.

(21) Appl. No.: 18/797,695

(22) Filed: Aug. 8, 2024

(65) Prior Publication Data

US 2024/0404433 A1 Dec. 5, 2024

Related U.S. Application Data

(63) Continuation of application No. 18/151,754, filed on Jan. 9, 2023, now Pat. No. 12,087,185, which is a (Continued)

(30) Foreign Application Priority Data

Oct. 12, 2020 (KR) ........................ 10-2020-0130931

(51) Int. Cl.

| | |
|---|---|
| ***G09F 9/30*** | (2006.01) |
| ***G06F 1/16*** | (2006.01) |
| ***H04M 1/02*** | (2006.01) |

(52) U.S. Cl.

CPC ............ *G09F 9/301* (2013.01); *G06F 1/1652* (2013.01); *G06F 1/1656* (2013.01); *H04M 1/0216* (2013.01)

(58) Field of Classification Search

CPC combination set(s) only.
See application file for complete search history.

(56) References Cited

U.S. PATENT DOCUMENTS 10,429,895 B2 * 10/2019 Lee ....................... G06F 1/1643
10,838,457 B2 11/2020 Yu
(Continued)

FOREIGN PATENT DOCUMENTS

| | | | |
|---|---|---|---|
| CN | 110649087 | A | 1/2020 |
| KR | 20200041412 | A | 4/2020 |
| KR | 20200089358 | A | 7/2020 |

OTHER PUBLICATIONS

PTO-0892 Notice(s) of References Cited (2 pages) and PTO-1449 Notice(s) indicating references considered by Examiner (8 pages), in related (parent) U.S. Appl. No. 18/151,754.

*Primary Examiner* — Lisa Lea-Edmonds
(74) *Attorney, Agent, or Firm* — CANTOR COLBURN LLP

(57) ABSTRACT

An electronic device includes a display panel including a folding area and a non-folding area which is adjacent to the folding area along a first direction, and a support member facing the display panel. The support member includes in order from the display panel, an upper plate which faces the folding area and the non-folding area, has a thickness and in which are defined a plurality of openings corresponding to the folding area, and a lower plate having a thickness which is greater than the thickness of the upper plate and including a first lower plate and a second lower plate each corresponding to the folding area and the non-folding area. At the folding area, the second lower plate is spaced apart from the first lower plate by a gap along the first direction.

21 Claims, 9 Drawing Sheets

Related U.S. Application Data continuation of application No. 17/359,719, filed on Jun. 28, 2021, now Pat. No. 11,551,586.

(56) References Cited

U.S. PATENT DOCUMENTS

| | | | | |
|---|---|---|---|---|
| 11,551,586 | B2 * | 1/2023 | Ha | H04M 1/0214 |
| 11,621,398 | B2 | 4/2023 | Jeon | |
| 11,783,734 | B2 * | 10/2023 | Han | G09F 9/301<br>345/173 |
| 11,979,997 | B2 * | 5/2024 | Kwak | G06F 1/1641 |
| 12,087,185 | B2 * | 9/2024 | Ha | G09F 9/301 |
| 12,468,337 | B2 * | 11/2025 | Choi | G06F 1/1677 |
| 2017/0062742 | A1 | 3/2017 | Kim | |
| 2019/0204867 | A1 * | 7/2019 | Song | G09G 3/3208 |
| 2020/0234616 | A1 * | 7/2020 | Ha | G09F 9/301 |
| 2020/0260603 | A1 | 8/2020 | Choi et al. | |
| 2020/0319672 | A1 * | 10/2020 | Kim | G06F 1/1656 |
| 2022/0114923 | A1 * | 4/2022 | Ha | G06F 1/1656 |
| 2023/0154361 | A1 * | 5/2023 | Ha | G06F 1/1616<br>361/679.01 |
| 2024/0404433 | A1 * | 12/2024 | Ha | H04M 1/0214 |
| 2025/0044889 | A1 * | 2/2025 | Jung | H05K 5/0217 |

* cited by examiner

ELECTRONIC DEVICE

This application is a continuation application of U.S. application Ser. No. 18/151,754 filed Jan. 9, 2023, which is a continuation application of U.S. application Ser. No. 17/359,719 filed Jun. 28, 2021 and issued as U.S. Pat. No. 11,551,586 on Jan. 10, 2023, which claims priority to Korean Patent Application No. 10-2020-0130931 filed on Oct. 12, 2020, and all the benefits accruing therefrom under 35 U.S.C. § 119, the disclosure of which is hereby incorporated by reference in its entirety.

BACKGROUND

(1) Field

The invention relates to an electronic device, and more particularly, to an electronic device which reduces or effectively prevents introduction of foreign substances while securing foldability, lightness, and impact-resistant properties.

(2) Description of the Related Art

An electronic device includes an active region that is activated with an electrical signal. The electronic device may use the active region to detect externally applied inputs and to also display various images to provide users with information. With the development of variously shaped electronic devices, the active region has various shapes.

Flexible electronic devices have been developed to include flexible display panels which are foldable. Unlike rigid electronic devices, the flexible electronic devices can be foldable, rollable or bendable. The flexible electronic device which is deformable into various shapes can be achieved regardless of an existing screen size to thereby improve a user's convenience.

SUMMARY

One or more embodiment provides an electronic device which reduces or effectively prevents introduction of foreign substances while securing folding, lightness, and impact-proof properties.

According one or more embodiment, an electronic device includes a display surface including a first non-folding area, a folding area and a second non-folding area that are sequentially defined along one direction, a window, a display panel below the window, and a support member below the display panel. The support member may include an upper plate in which are defined a plurality of openings that overlap the folding area, and a lower plate below the upper plate and having a thickness greater than a thickness of the upper plate. The lower plate may include a first lower plate and a second lower plate which is spaced apart from the first lower plate. A gap at which the first and second lower plates are spaced apart from each other may be defined to overlap the folding area.

In an embodiment, the thickness of the upper plate may be in a range of about 15 micrometers to about 50 micrometers. The thickness of the lower plate may be in a range of about 150 micrometers to about 300 micrometers.

In an embodiment, a specific strength of the upper plate may be equal to or greater than about 60 kN·m/kg.

In an embodiment, the upper plate may include at least one selected from a stainless steel, a titanium alloy, a nickel alloy, a beryllium alloy and a nickel-titanium alloy.

In an embodiment, the lower plate may include at least one selected from an aluminum alloy, a nickel alloy, a magnesium alloy, an aluminum-magnesium alloy and a glass fiber reinforced plastic ("GFRP").

In an embodiment, at least one plate folding area may be defined on the upper plate. The plurality of openings may be defined in the plate folding area.

In an embodiment, a width of each of the plurality of openings may be equal to or less than about 50 micrometers.

In an embodiment, the upper plate may include a first plate non-folding area, the plate folding area and a second non-folding area that are sequentially arranged along a first direction.

In an embodiment, the electronic device may further include a lower cushion layer below the lower plate.

In an embodiment, the electronic device may further include a cushion layer between the support member and the display panel.

In an embodiment, the support member may further include a planarization layer on the upper plate.

In an embodiment, the planarization layer may include polyurethane or thermoplastic polyurethane.

In an embodiment, the upper plate may include polyimide.

In an embodiment, the electronic device may further include a lower cushion layer below the lower plate.

In an embodiment, the support member may further include a cover film between the upper plate and the lower plate.

In an embodiment, the electronic device may further include an antireflection member between the display panel and the window.

According to an embodiment, an electronic device includes a window, a display panel below the window, and a support member below the display panel. The support member may include an upper plate in which a plurality of openings are defined, the upper plate including at least one selected from a stainless steel, a titanium alloy, a nickel alloy, a beryllium alloy and a nickel-titanium alloy, and a lower plate below the upper plate, the lower plate including at least one selected from an aluminum alloy, a nickel alloy, a magnesium alloy, an aluminum-magnesium alloy and a glass fiber reinforced plastic ("GFRP").

In an embodiment, the upper plate may have a thickness of about 15 micrometers to about 50 micrometers.

In an embodiment, the lower plate may have a thickness of about 150 micrometers to about 300 micrometers.

According to an embodiment, an electronic device includes a window, a display panel below the window, and a support member below the display panel. The support member may include an upper plate in which at least one plate folding area is defined, the upper plate having a thickness of about 15 micrometers to about 50 micrometers, and a lower plate below the upper plate. A plurality of openings may be defined in the plate folding area.

In an embodiment, the upper plate may include at least one selected from a stainless steel, a titanium alloy, a nickel alloy, a beryllium alloy and a nickel-titanium alloy. The lower plate may include at least one selected from an aluminum alloy, a nickel alloy, a magnesium alloy, an aluminum-magnesium alloy and a glass fiber reinforced plastic ("GFRP").

In an embodiment, the lower plate may have a thickness of about 150 micrometers to about 300 micrometers.

BRIEF DESCRIPTION OF THE DRAWINGS

The above and other advantages and features of this disclosure will become more apparent by describing in further detail embodiments thereof with reference to the accompanying drawings, in which.

DETAILED DESCRIPTION

Figure 1A:
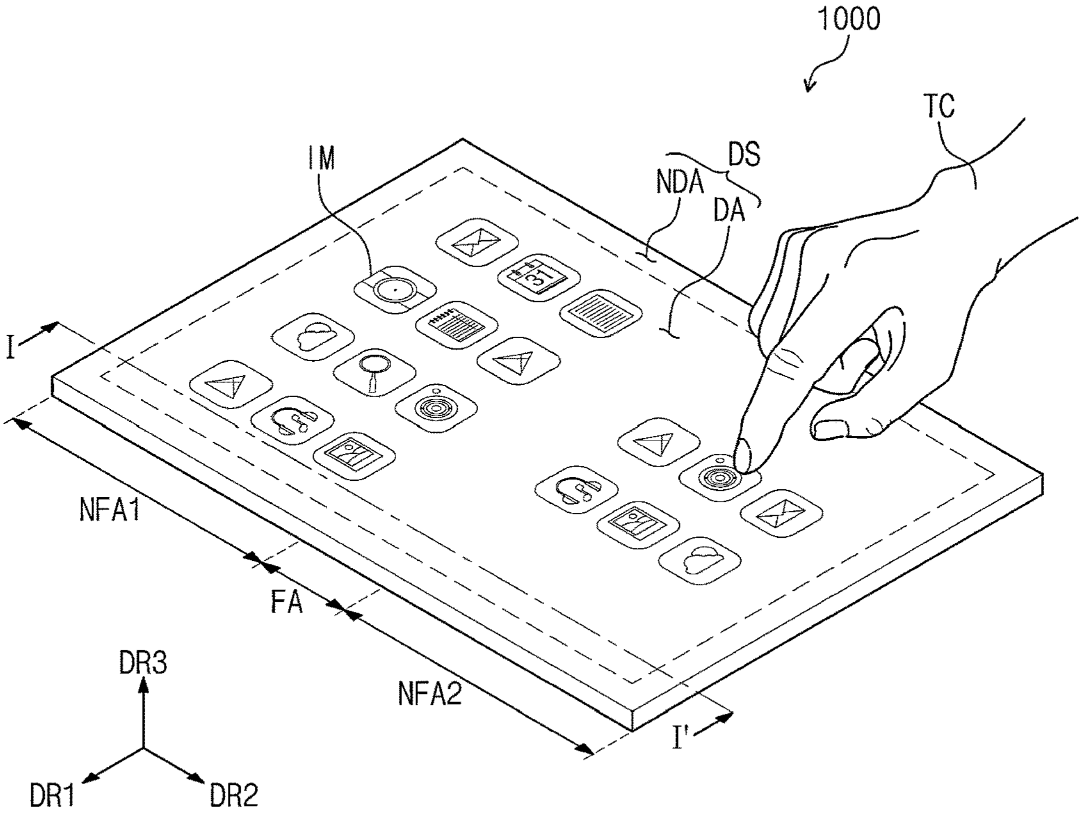
FIG. 1A illustrates a perspective view showing an embodiment of an electronic device.

The following will now describe embodiments of the invention in conjunction with the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like numerals indicate like components.

In this description, when a component (or region, layer, portion, etc.) is referred to as being related to another component such as being "on," "connected to" or "coupled to" other component(s), the component may be directly disposed on, directly connected to or directly coupled to the other component(s) or at least one intervening component may be present therebetween.

Moreover, in the drawings, thicknesses, ratios, and dimensions of components are exaggerated for effectively explaining the technical contents.

The terminology used herein is for the purpose of describing particular embodiments only and is not intended to be limiting. As used herein, "a," "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." The term "and/or" includes one or more combinations defined by associated components.

It will be understood that, although the terms first, second, etc. may be used herein to describe various components, these components should not be limited by these terms. These terms are only used to distinguish one component from another component. For example, a first component could be termed a second component, and vice versa without departing from the scope of the invention. Unless the context clearly indicates otherwise, the singular forms are intended to include the plural forms as well.

In addition, the terms "beneath," "lower," "above," "upper" and the like are used herein to describe one component's relationship to other component(s) illustrated in the drawings. The relative terms are intended to encompass different orientations in addition to the orientation depicted in the drawings.

It should be understood that the terms "comprise," "include," "have" and the like are used to specify the presence of stated features, integers, steps, operations, components, elements, or combinations thereof, but do not preclude the presence or addition of one or more other features, integers, steps, operations, components, elements, or combinations thereof.

In this description, the phrase "directly disposed" may mean that no additional element, such a layer, a film, a region or a plate, is present between a portion and other portion of a layer, a film, a region, a plate, or the like. For example, the phrase "directly disposed" may mean that no additional member such as an adhesive member is provided between two layers or members.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms used herein including technical and scientific terms have the same meaning generally understood by one of ordinary skilled in the art. Also, terms as defined in dictionaries generally used should be understood as having meaning identical or meaning contextually defined in the art and should not be understood as ideally or excessively formal meaning unless definitely defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The following will now describe embodiments of the invention in conjunction with the accompanying drawings.

Figure 1B:
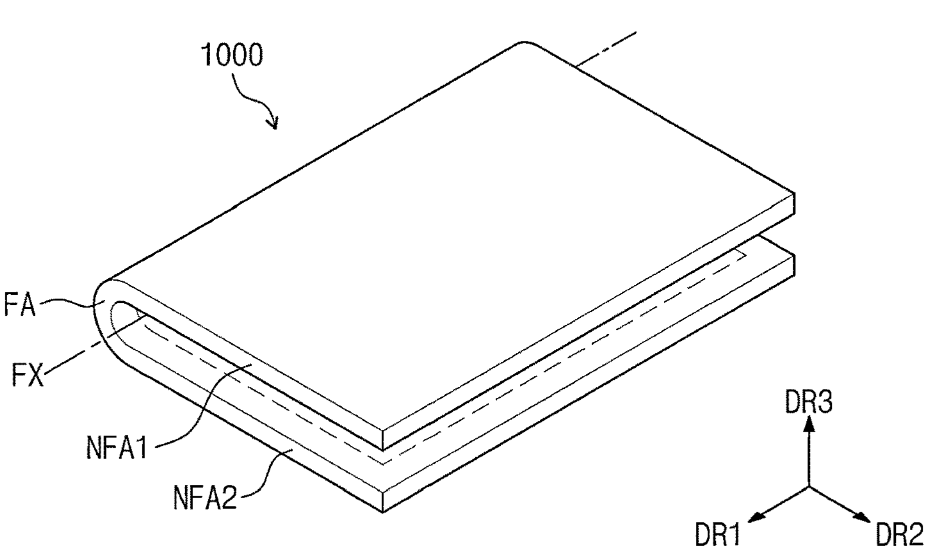
FIG. 1B illustrates a perspective view showing an embodiment of the electronic device depicted in FIG. 1A which is folded.

FIG. 1A illustrates a perspective view showing an embodiment of an electronic device 1000. FIG. 1B illustrates a perspective view showing the electronic device 1000 depicted in FIG. 1A which is folded.

Referring to FIGS. 1A and 1B, an electronic device 1000 may be a foldable display device. The electronic device 1000 may be applicable not only to large-sized electronic products such as television sets and monitors, but to small and medium-sized electronic products such as mobile phones, tablet personal computer ("PCs"), automotive navigation systems, game consoles and smart watches.

The electronic device 1000 may have a top surface defined as a display surface DS, and when the electronic device 1000 is folded or unfolded (e.g., flat), the display surface DS may be in a plane parallel to a plane defined by a first direction DR1 and a second direction DR2 crossing each other.

The display surface DS may include a display area DA and a non-display area NDA adjacent to the display area DA. In an embodiment, the non-display area NDA may be around the display area DA. The display area DA may be a planar area where an image IM is displayed, and the non-display area NDA may be a planar area where the image IM is not displayed. FIG. 1A shows application icons as an example of the image IM.

The display area DA may have a tetragonal shape in a plan view. In an embodiment, the non-display area NDA may surround the display area DA. The invention, however, is not limited thereto, and the display area DA and the non-display area NDA may be relatively designed in shape.

The electronic device 1000 may include a first non-folding area NFA1, a folding area FA and a second non-folding area NFA2 that are sequentially defined along the second direction DR2 between the non-folding areas NFA1 and NFA2. The folding area FA may be a planar area at which the electronic device 1000 and components thereof are foldable. A non-folding area may be a planar area at which the electronic device 1000 and components thereof are not foldable and/or remain flat even in the electronic device 1000 which is folded.

Various components or layers of the electronic device 1000 may include a folding area FA and a non-folding area corresponding to those described above for the electronic device 1000. Various components or layers of the electronic device 1000 may be foldable together with each other.

In an embodiment, for example, the folding area FA may be defined between the first non-folding area NFA1 and the second non-folding area NFA2. Although FIGS. 1A and 1B show one of the folding area FA and two of the non-folding areas NFA1 and NFA2, no limitation is imposed on the number of the folding area FA or the number of the non-folding areas NFA1 and NFA2. In an embodiment, for example, the electronic device 1000 may include more than two non-folding areas and a plurality of folding areas each of which is disposed respectively between neighboring non-folding areas.

The electronic device 1000 may be foldable about a folding axis FX. In an embodiment, for example, the folding area FA may be bendable about the folding axis FX. The folding axis FX may extend along the first direction DR1. The folding axis FX may be defined as a minor axis of the electronic device 1000 that is parallel to a short side of the electronic device 1000.

When the electronic device 1000 is folded, portions of the display surface DS at the first and second non-folding areas NFA1 and NFA2 may face each other. Therefore, in the electronic device 1000 which is folded, the display surface DS may not be exposed externally or face outside of the electronic device 1000. This, however, is only an example, and the invention is not limited thereto. In embodiments, when the electronic device 1000 is folded, portions of the display surface DS at the first and second non-folding areas NFA1 and NFA2 may face in opposite directions. Therefore, in display surface DS may be exposed externally to face outside of the electronic device 1000.

Figure 2A:
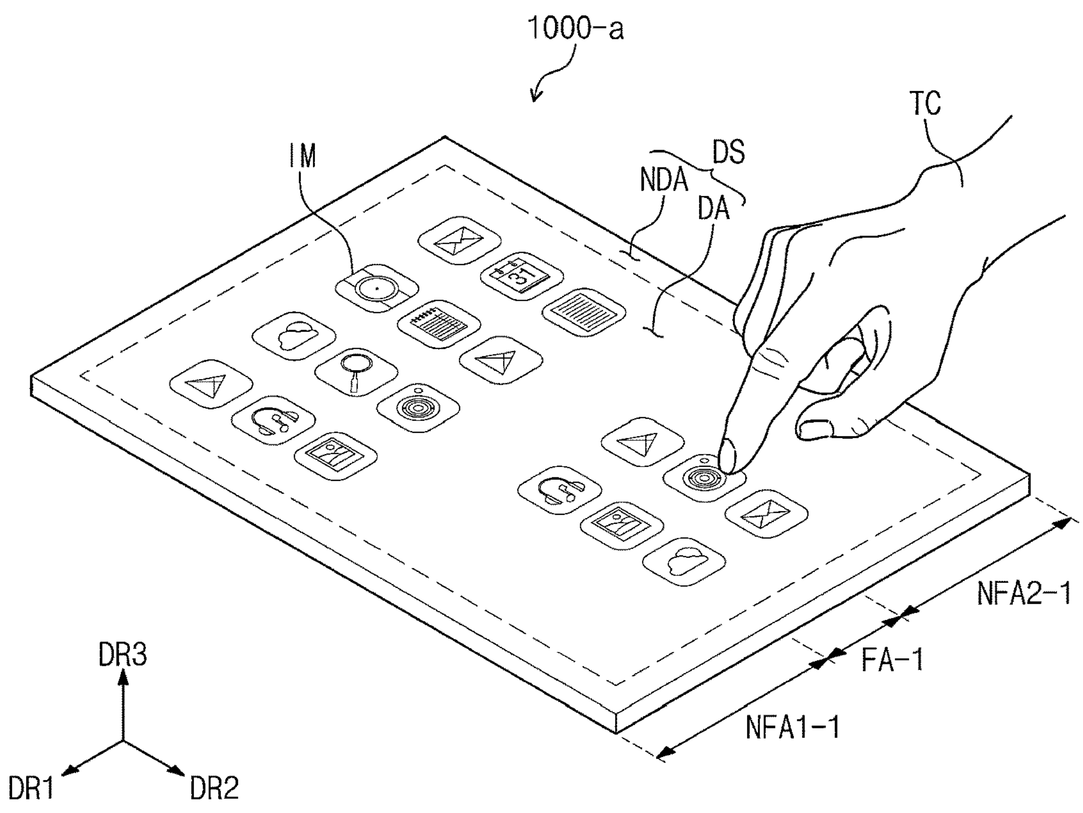
FIG. 2A illustrates a perspective view showing an embodiment of an electronic device.
Figure 2B:
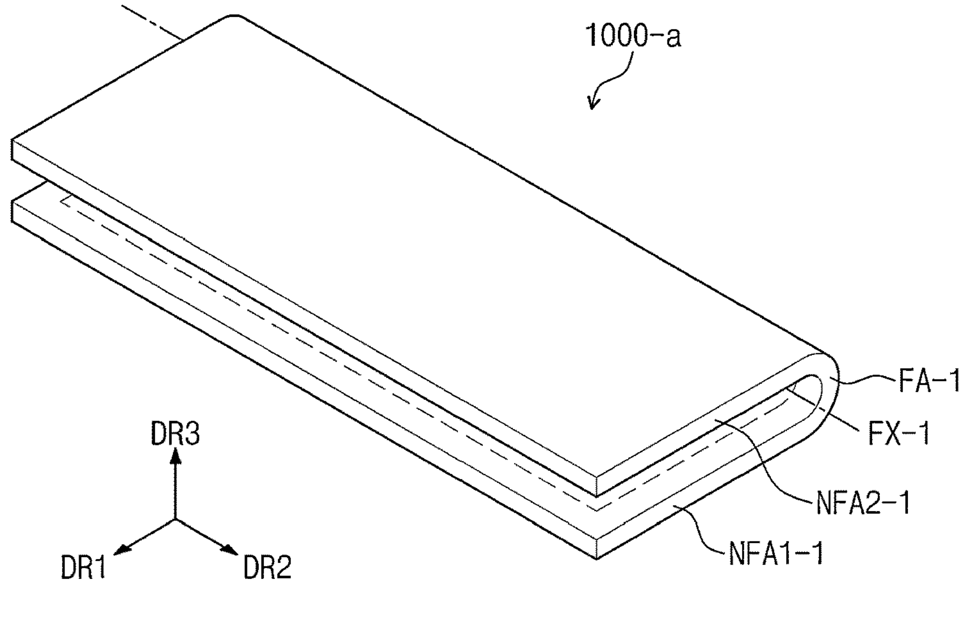
FIG. 2B illustrates a perspective view showing the electronic device depicted in FIG. 2A which is folded.

FIG. 2A illustrates a perspective view showing an embodiment of an electronic device 1000-*a*. FIG. 2B illustrates a perspective view showing the electronic device 1000-*a* depicted in FIG. 2A which is folded.

Referring to FIGS. 2A and 2B, an electronic device 1000-*a* may include a first non-folding area NFA1-1, a folding area FA-1 and a second non-folding area NFA2-1 that are sequentially defined along the first direction DR1. The folding area FA-1 may be defined between the first non-folding area NFA1-1 and the second non-folding area NFA2-1.

The electronic device 1000-*a* may be foldable about a folding axis FX-1. In an embodiment, for example, the folding area FA-1 may be bendable about the folding axis FX-1. The folding axis FX-1 may extend along the second direction DR2. The folding axis FX-1 may be defined as a major axis of the electronic device 1000-*a* that is parallel to a long side of the electronic device 1000-*a*.

The following will discuss a structure of the electronic device 1000 that is foldable about the minor axis, but the invention is not limited thereto, and subsequently described structures may also be applicable to the electronic device 1000-*a* that is foldable about the major axis.

Figure 3:
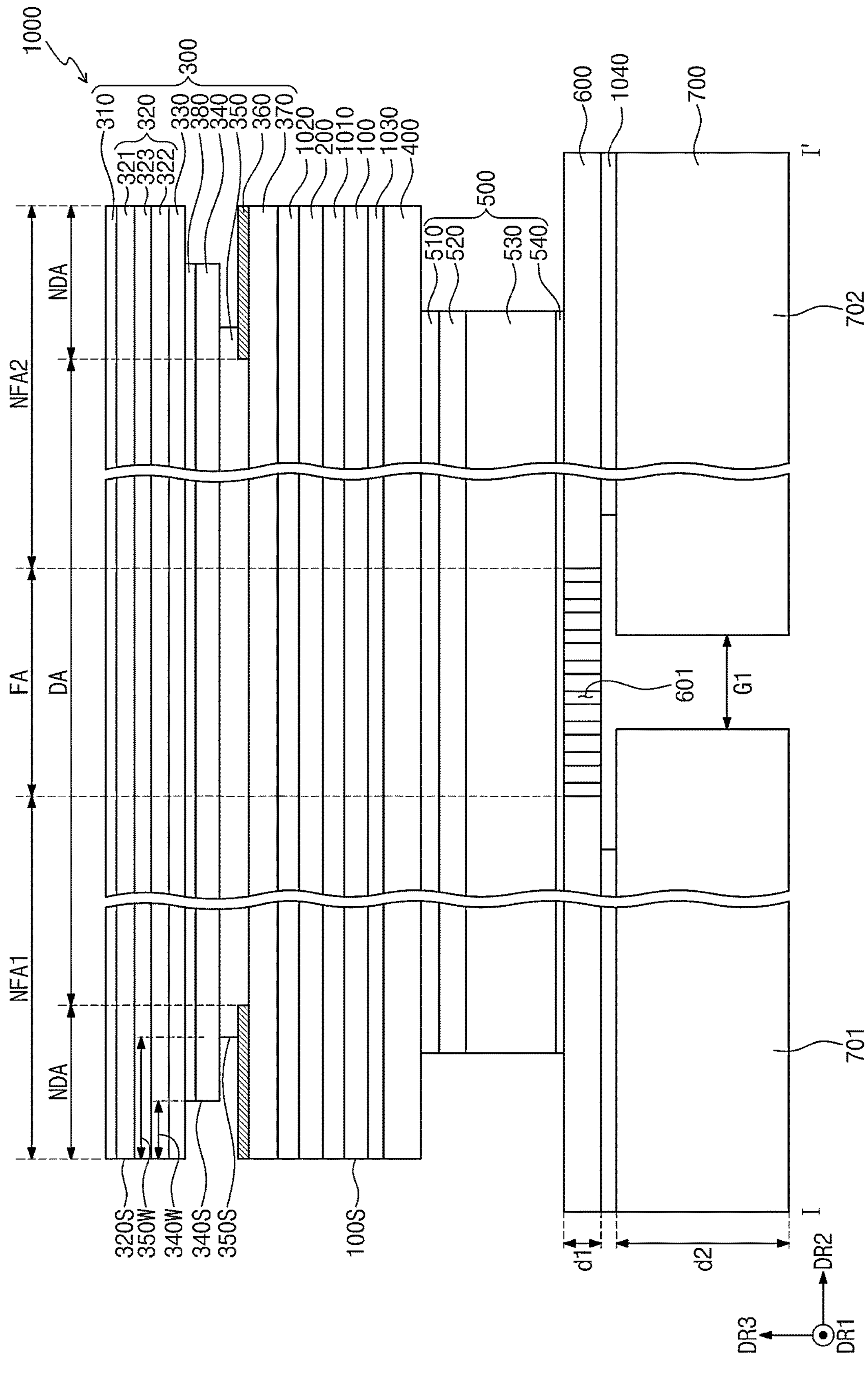
FIG. 3 illustrates a cross-sectional view showing an embodiment of an electronic device.
Figure 4:
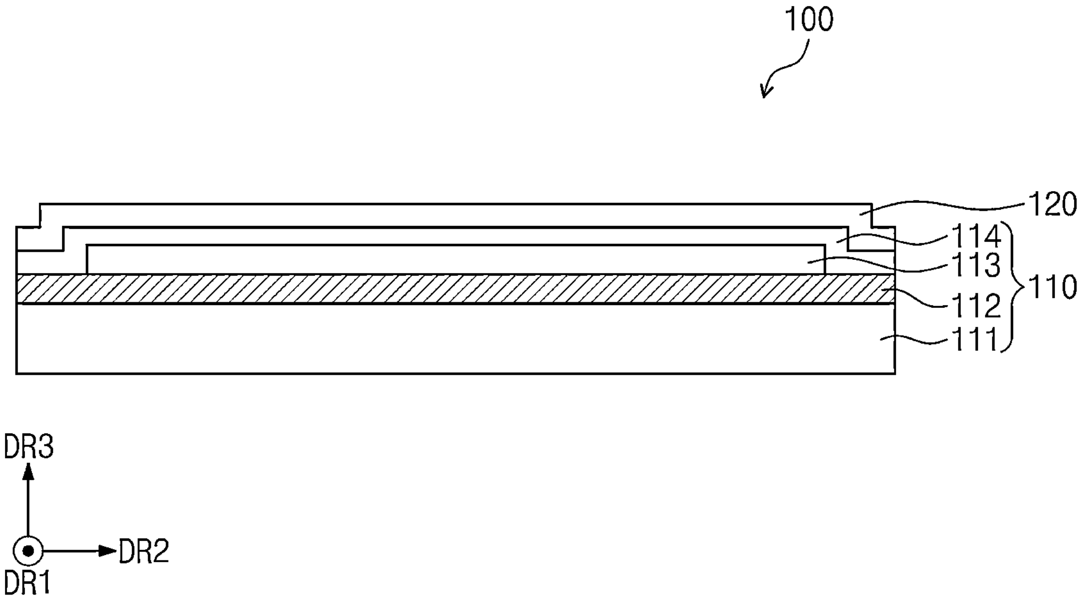
FIG. 4 illustrates a cross-sectional view showing an embodiment of a display panel.
Figure 5A:
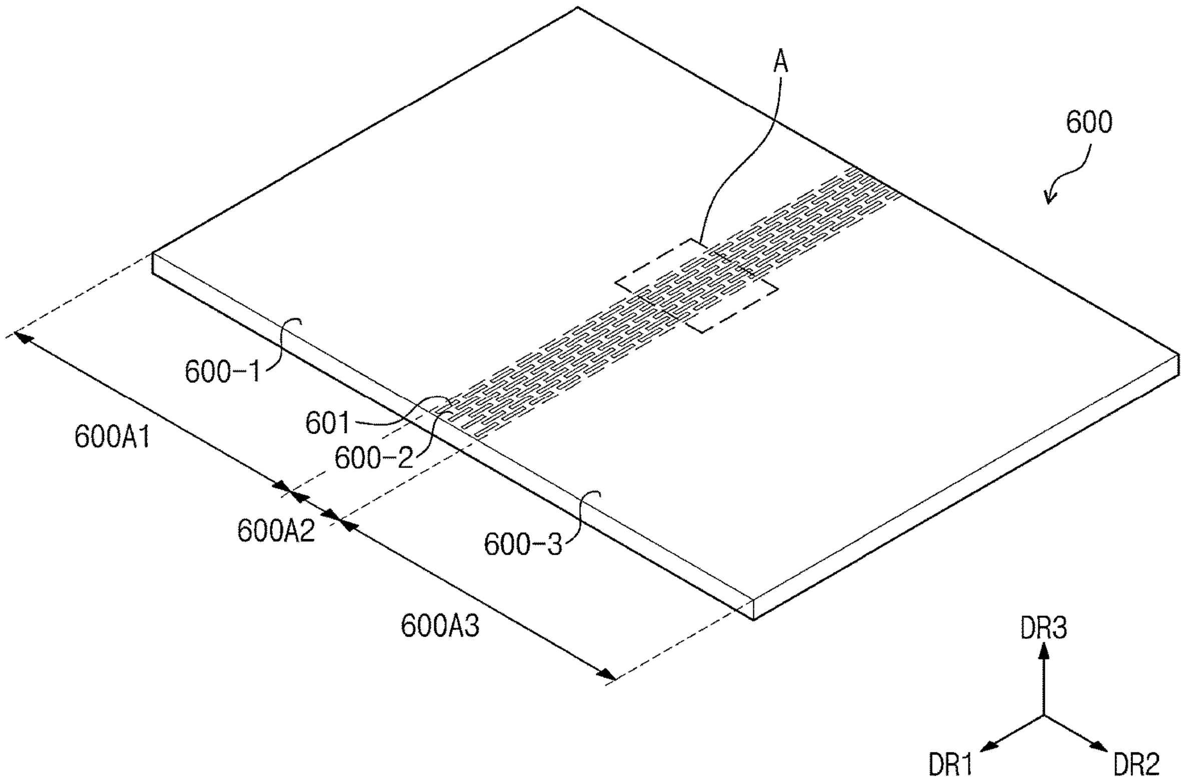
FIG. 5A illustrates a perspective view showing an embodiment of a component of an electronic device.
Figure 5B:
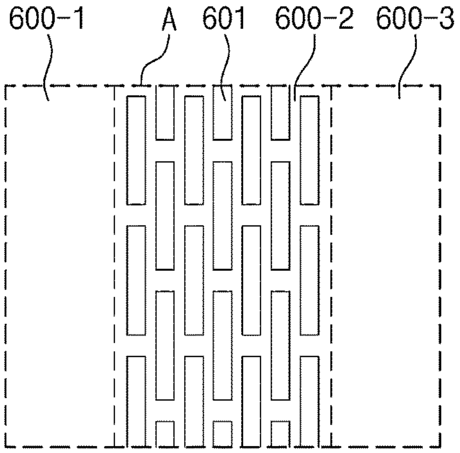
FIG. 5B illustrates a plan view of an embodiment of section A depicted in FIG. 5A.
Figure 5C:
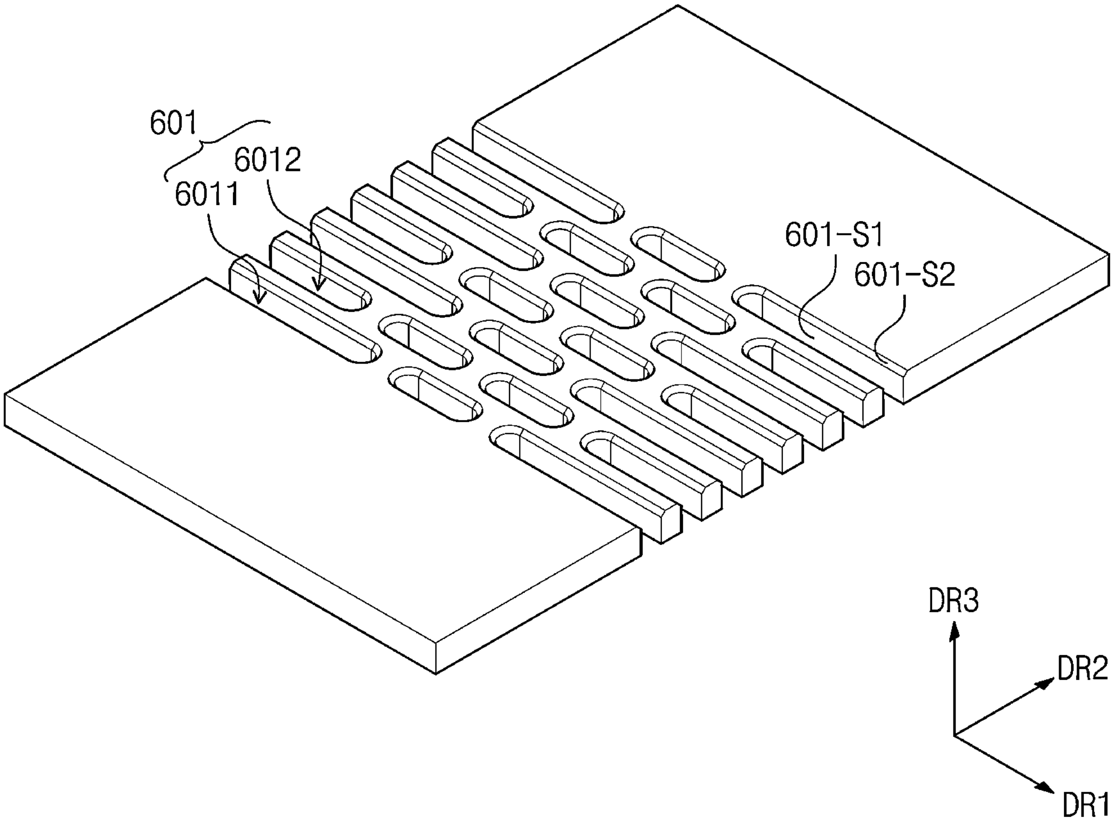
FIG. 5C illustrates a perspective view of an embodiment of section A depicted in FIG. 5A.

FIG. 3 illustrates a cross-sectional view showing an embodiment of an electronic device 1000. FIG. 3 depicts a cross-sectional view showing an electronic device 1000 taken along line I-I' of FIG. 1A. FIG. 4 illustrates a cross-sectional view showing an embodiment of a display panel 100. FIG. 5A illustrates a perspective view showing an embodiment of a component of an electronic device 1000. FIG. 5B illustrates a plan view of an embodiment of section A depicted in FIG. 5A, partially showing a component of an electronic device 1000. FIG. 5C illustrates a perspective view of an embodiment of section A depicted in FIG. 5A, partially showing a component of an electronic device 1000.

FIGS. 3 and 4 describe by way of example the electronic device 1000 shown in FIG. 1A, but the invention is not limited thereto, and the description of the electronic device 1000 may be similarly applicable to the electronic device 1000-*a* shown in FIGS. 2A and 2B. FIG. 5A depicts a perspective view showing an embodiment of an upper plate 600 of an electronic device 1000. FIG. 5B depicts a plan view showing an embodiment of section A that overlaps the upper plate 600 of FIG. 5A. FIG. 5C depicts a perspective view showing an embodiment of section A that overlaps the upper plate 600 of FIG. 5A.

Referring to FIG. 3, the electronic device 1000 may include a display panel 100, upper functional layers and lower functional layers. One or more among the display panel 100, the upper functional layers and the lower functional layers may be foldable and unfoldable together with each other, without being limited thereto.

Referring to FIG. 4, the display panel 100 may be a component that generates an image IM and detects an externally applied input. In an embodiment, for example, the display panel 100 may include a display layer 110 and a sensor layer 120 which faces the display layer 110. The display panel 100 may have a thickness of about 25 micrometers to about 45 micrometers, for example, of about 35 micrometers, but no limitation is imposed on the thickness of the display panel 100.

The display layer 110 may be a component that substantially generates an image IM. The display layer 110 may be an emissive display layer, for example, an organic light emitting display layer, a quantum-dot display layer or a micro-led display layer. Based on a configuration of the display layer 110, the display panel 100 may be an organic light emitting display panel, a quantum-dot display panel or a micro-led display panel.

The display layer 110 may include a base layer 111, a circuit layer 112, a light emitting element layer 113 and an encapsulation layer 114 in order toward the sensor layer 120.

The base layer 111 may include a synthetic resin layer. The synthetic resin layer may include a thermosetting resin. In an embodiment, for example, the synthetic resin layer may be a polyimide-based resin layer, but no limitation is imposed on the material of the synthetic resin layer. The synthetic resin layer may include at least one selected from acryl-based resin, methacryl-based resin, polyisoprene, vinyl-based resin, epoxy-based resin, urethane-based resin, cellulose-based resin, siloxane-based resin, polyamide-based resin and perylene-based resin. The base layer 111 may include a glass substrate or an organic/inorganic composite substrate.

The base layer 111 may have a multi-layered structure. In an embodiment, for example, the base layer 111 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be called a base barrier layer.

Each of the first and second synthetic resin layers may include a polyimide-based resin. Additionally or alternatively, each of the first and second synthetic resin layers may include at least one selected from acrylate-based resin, methacrylate-based resin, polyisoprene-based resin, vinyl-based resin, epoxy-based resin, urethane-based resin, cellulose-based resin, siloxane-based resin, polyamide-based resin and perylene-based resin. In this description, the language "X-based resin" may mean a resin including a functional group of X.

The base layer 111 may have a thickness of about 10 micrometers to about 30 micrometers. In an embodiment, for example, the base layer 111 may have a thickness of about 20 micrometers.

The circuit layer 112 may be disposed on the base layer 111. The circuit layer 112 may include a dielectric layer, a semiconductor pattern, a conductive pattern, a signal line and the like. Coating and deposition processes may be employed such that a dielectric layer, a semiconductor layer and a conductive layer are provided or formed on the base layer 111, and then a photolithography process may be performed several times to selectively pattern the dielectric layer, the semiconductor layer and the conductive layer. Afterwards, the semiconductor pattern, the conductive pattern and the signal line may be provided or formed which are included in the circuit layer 112.

The light emitting element layer 113 may be disposed on the circuit layer 112. The light emitting element layer 113 may include the light emitting element. In an embodiment, for example, the light emitting element layer 113 may include an organic light emitting material, a quantum dot, a quantum rod or a micro-led.

A sum of thicknesses of the circuit layer 112 and the light emitting element layer 113 may range from about 1 micrometer to about 5 micrometers. In an embodiment, for example, the circuit layer 112 and the light emitting element layer 113 may have their total thickness of about 3 micrometers.

The encapsulation layer 114 may be disposed on the light emitting element layer 113. The encapsulation layer 114 may include an inorganic layer, an organic layer and an inorganic layer that are sequentially stacked, but no limitation is imposed on the constituent layers of the encapsulation layer 114.

The inorganic layers may protect the light emitting element layer 113 against moisture and oxygen, and the organic layer may protect the light emitting element layer 113 against foreign substances such as dust particles. The inorganic layers may include a silicon nitride layer, a silicon oxynitride layer, a silicon oxide layer, a titanium oxide layer or an aluminum oxide layer. The organic layer may include an acryl-based organic layer, but the invention is not limited thereto.

The encapsulation layer 114 may have a thickness of about 3 micrometers to about 10 micrometers. In an embodiment, for example, the encapsulation layer 114 may have a thickness of about 6 micrometers.

The sensor layer 120 may be disposed on the display layer 110. The sensor layer 120 may detect an external input TC that is externally applied. The external input TC may include light, heat, pressure or contact from a input tool such as a body part, a pen, etc.

A successive process may be employed to provide or form the sensor layer 120 on the display layer 110. In this case, the sensor layer 120 may be directly disposed on the display layer 110. In an embodiment, for example, the sensor layer 120 and the display layer 110 may contact each other without a third component therebetween. In this case, no adhesive member may be separately disposed between the sensor layer 120 and the display layer 110. As being in contact, components may form an interface with each other since a separate member is omitted therebetween. When the sensor layer 120 is directly disposed on the display layer 110, the sensor layer 120 may have a thickness of about 2 micrometers.

Alternatively, the sensor layer 120 may be coupled to the display layer 110 through a third component such as an adhesive member. The adhesive member may include an ordinary adhesive or glue. In an embodiment, for example, the adhesive member may include a pressure sensitive adhesive ("PSA") film (or layer), an optically clear adhesive ("OCA") film (or layer) or an optically clear resin ("OCR").

Referring back to FIG. 3, the upper functional layers may be disposed on the display panel 100. In an embodiment, for example, the upper functional layers may include an antireflection member 200 and an upper member 300.

The antireflection member 200 may be called an antireflection layer. The antireflection member 200 may reduce a reflectance of external light that is externally incident to the electronic device 1000. The antireflection member 200 may include a stretchable synthetic resin film. In an embodiment, for example, the antireflection member 200 may be a polyvinyl alcohol ("PVA") film which is dyed with an iodine compound. This, however, is merely exemplary, and no limitation is imposed on the material of the antireflection member 200. The antireflection member 200 may have a thickness of about 3 micrometers to about 35 micrometers, but no limitation is imposed on the thickness of the antireflection member 200.

The antireflection member 200 may include color filters. The color filters may be arranged in a pattern. For the antireflection member 200, the color filters may be arranged in consideration of colors emitted from pixels included or defined by in the display layer 110. In addition, the antireflection member 200 may further include a light-blocking member which is adjacent to the color filters.

The antireflection member 200 may include a destructive-interference structure. In an embodiment, for example, the destructive-interference structure may include a first reflection layer and a second reflection layer that are located at different levels or distances relative to the display panel 100. A first reflected light and a second reflected light, which are respectively reflected from the first reflection layer and the second reflection layer, may interfere destructively each other, and thus a reflectance of external light may be reduced.

The antireflection member 200 may be combined with the display panel 100 through a first adhesion layer 1010. The first adhesion layer 1010 may be a transparent adhesive, such as a pressure sensitive adhesive ("PSA") film, an optically clear adhesive ("OCA") film, or an optically clear resin ("OCR"). The following described adhesion layer may include an ordinary adhesive or glue. The first adhesion layer 1010 may have a thickness of about 20 micrometers to about 30 micrometers, for example, of about 25 micrometers, but no limitation is imposed on the thickness of the first adhesion layer 1010.

In embodiments, the first adhesion layer 1010 may be omitted, and the antireflection member 200 may be directly disposed on the display panel 100. In this case, no adhesion layer may be separately disposed between the antireflection member 200 and the display panel 100. When the antireflection member 200 is directly disposed on the display panel 100, the antireflection member 200 may have a thickness of about 4.8 micrometers.

The upper member 300 may be disposed on the antireflection member 200. The upper member 300 may face the display panel 100 with the antireflection member 200 therebetween. The upper member 300 may include a first hard coating layer 310, a protection layer 320, a first upper adhesion layer 330, a window 340, a second upper adhesion layer 350, a black matrix 360, a shock absorption layer 370 and a second hard coating layer 380. Components included in the upper member 300 are not limited those mentioned above. At least one of the components mentioned above may be omitted, and other components may be added to.

The first hard coating layer 310 may be disposed at an outermost side of the electronic device 1000. The first hard coating layer 310 may define the display surface DS. The first hard coating layer 310 may be a functional layer to improve utility characteristics of the electronic device 1000, and may be coated on the protection layer 320. In an embodiment, for example, the first hard coating layer 310 may improve anti-fingerprint properties, pollution-free properties and/or anti-scratch properties. The first hard coating layer 310 may have a thickness of about 1 micrometer to about 5 micrometers, for example, of about 3 micrometers.

The protection layer 320 may be disposed below the first hard coating layer 310. The protection layer 320 may protect components disposed below the protection layer 320. To improve chemical resistance and/or wear resistance, the protection layer 320 may be additionally provided thereon with the first hard coating layer 310, an anti-fingerprint layer and the like. The protection layer 320 may include a film whose elastic modulus is equal to or less than about 15 gigapascals (GPa) at room temperature. The protection layer 320 may have a thickness of about 30 micrometers to about 200 micrometers, but no limitation is imposed on the thickness of the protection layer 320. In embodiments, the protection layer 320 may be omitted.

The protection layer 320 may have a multi-layered structure. In an embodiment, for example, the protection layer 320 may include a plurality of synthetic resin films that are combined with each other through an adhesive. The protection layer 320 may include a first protection layer 321, a second protection layer 322 facing the first protection layer 321, and a protective adhesion layer 323 that combines the first and second protection layers 321 and 322 with each other. For the protection layer 320, each of the first and second protection layers 321 and 322 may have a thickness of about 30 micrometers to about 120 micrometers. In an embodiment, for example, the first protection layer 321 may have a thickness of about 100 micrometers, and the second protection layer 322 may have a thickness of about 40 micrometers.

The first upper adhesion layer 330 may be disposed below the protection layer 320. The first upper adhesion layer 330 may combine the protection layer 320 with the window 340. The first upper adhesion layer 330 may have a thickness of about 20 micrometers to about 60 micrometers, for example, of about 50 micrometers, but no limitation is imposed on the thickness of the first upper adhesion layer 330.

The window 340 may be disposed below the first upper adhesion layer 330. The window 340 may include an optically transparent dielectric material. In an embodiment, for example, the window 340 may include a glass substrate or a synthetic resin film. When the window 340 is a glass substrate, the window 340 may have a thickness of equal to or less than about 80 micrometers, for example, of about 40 micrometers, but no limitation is imposed on the thickness of the window 340.

When the window 340 is a synthetic resin film, the window 340 may include a polyimide ("PI") film or a polyethylene terephthalate ("PET") film.

The window 340 may have a single-layered or multi-layered structure. In an embodiment, for example, the window 340 may include either a plurality of synthetic resin films that are coupled to each other through an adhesive or a glass substrate with a plastic film coupled thereto through an adhesive.

The second hard coating layer 380 may be disposed on a top surface of the window 340 which is furthest from the display panel 100. The second hard coating layer 380 may be a functional layer to improve utility characteristics of the electronic device 1000, and may be coated on the top surface of the window 340. In an embodiment, for example, the second hard coating layer 380 may improve pollution-free properties, anti-scratch properties and/or impact-proof properties. The second hard coating layer 380 may have a thickness of about 1 micrometer to about 5 micrometers, for example, of about 1.5 micrometers.

The second upper adhesion layer 350 may be disposed below the window 340. The second upper adhesion layer 350 may combine the window 340 with the shock absorption layer 370. The second upper adhesion layer 350 may have a thickness of about 30 micrometers to about 40 micrometers, for example, of about 35 micrometers, but no limitation is imposed on the thickness of the second upper adhesion layer 350.

In embodiments, a sidewall 340S of the window 340 and a sidewall 350S of the second upper adhesion layer 350 may be located more inwardly than sidewalls of other layers, for example, than a sidewall 100S of the display panel 100 and a sidewall 320S of the protection layer 320. The phrase "located more inwardly than" may mean "is closer than other comparative components to the display area DA."

A folding operation of the electronic device 1000 may change a positional relationship between layers. According to embodiments, since the sidewall 340S of the window 340 is disposed more inwardly than each of the sidewall 100S of the display panel 100 and the sidewall 320S of the protection layer 320, even when the positional relationship is changed between layers, protrusion of the sidewall 340S of the window 340 further than the sidewall 320S of the protection layer 320 in a direction along the display panel 100 may be less likely. Therefore, transfer of external impact through the sidewall 340S of the window 340 is reduced. As a result, cracking of the window 340 from an external impact may be reduced.

A first distance 340W may be provided between the sidewall 340S of the window 340 and the sidewall 320S of the protection layer 320. In this description, the first distance 340W may indicate a distance in a direction parallel to the first direction DR1 and/or the second direction DR2. In addition, when viewed in plan (e.g., in a plan view along a third direction DR3 (e.g., thickness direction), the first distance 340W may correspond to a distance between the sidewall 340S and the sidewall 320S.

The first distance 340W may range from about 180 micrometers to about 205 micrometers, for example, may be about 196 micrometers, but is not limited thereto. In an embodiment, for example, the first distance 340W may be equal to or greater than about 50 micrometers, for example, may be about 300 micrometers. An increase in the first distance 340W may cause the protection layer 320 to protrude further than the sidewall 340S of the window 340 and to have a bending portion which is attachable to another component, for example, a casing. Moreover, an increase in a planar area of the protection layer 320 may reduce the introduction of foreign substances from above the protection layer 320 to below the protection layer 320 and various layers thereunder.

In addition, a lamination process may cause attachment of the window 340 and the second upper adhesion layer 350 to the shock absorption layer 370. In consideration of an allowance of the lamination process, each of the window 340 and the second upper adhesion layer 350 may have a planar area less than that of the shock absorption layer 370. Moreover, the planar area of the second upper adhesion layer 350 may be less than the planar area of the window 340 (e.g., relative planar areas are illustrated by dimensions along the second direction DR2 in FIG. 3, for example). In an embodiment, for example, the second upper adhesion layer 350 may be supplied with pressure in a process where the window 340 is attached. The second upper adhesion layer 350 may be pressurized to expand in direction parallel to the first and second directions DR1 and DR2, that is, in a direction along the display panel 100. In this case, the planar area of the second upper adhesion layer 350 may be less than the planar area of the window 340 so as not to allow the second upper adhesion layer 350 to protrude further than an edge of the window 340 defined by the sidewall 340S thereof.

In a case the first upper adhesion layer 330 is attached to the second upper adhesion layer 350, the window 340 may not be slidable when the electronic device 1000 is folded and may thus experience a buckling phenomenon. However, according to embodiments, the planar area of the second upper adhesion layer 350 may be less than the planar area of the window 340. Therefore, the first upper adhesion layer 330 may remain unattached to the second upper adhesion layer 350, and foreign substances may be less likely to be attached to the second upper adhesion layer 350.

A second distance 350W may be provided between the sidewall 350S of the second upper adhesion layer 350 and the sidewall 320S of the protection layer 320. In this description, the second distance 350W may indicate a distance in a direction parallel to the second direction DR2 and/or the first direction DR1. In addition, when viewed in plan, the second distance 350W may correspond to a distance between the sidewall 350S and the sidewall 320S.

The second distance 350W may be about 392 micrometers, but is not limited thereto. In an embodiment, for example, the second distance 350W may range from about 292 micrometers to about 492 micrometers, but is not limited to this range.

The black matrix 360 may be disposed between the shock absorption layer 370 and the second upper adhesion layer 350. The black matrix 360 may be printed on a top surface of the shock absorption layer 370. The black matrix 360 may overlap or correspond to the non-display area NDA. The black matrix 360 may be a coated cosmetic layer. The black matrix 360 may include a colored organic material or an opaque metallic material, but no limitation is imposed on the material of the black matrix 360.

FIG. 3 depicts by way of example an embodiment in which the black matrix 360 is disposed on the top surface of the shock absorption layer 370, but no limitation is imposed on the position of the black matrix 360. In an embodiment, for example, the black matrix 360 may be provided on a top surface of the protection layer 320, a bottom surface of the protection layer 320, a top surface of the window 340 or a bottom surface of the window 340. In addition, the black matrix 360 may include a plurality of layers. In this case, a portion of the black matrix 360 may be provided on the top surface of the shock absorption layer 370, and another portion of the black matrix 360 may be provided on the top surface of the protection layer 320, the bottom surface of the protection layer 320, the top surface of the window 340 or the bottom surface of the window 340.

The shock absorption layer 370 may be a functional layer to protect the display panel 100 against external impacts. The shock absorption layer 370 may include a film having an elastic modulus is equal to or greater than about 1 gigapascal (GPa) at room temperature. The shock absorption layer 370 may be a stretchable film having an optical function. In an embodiment, for example, the shock absorption layer 370 may be an optical axis control film. The shock absorption layer 370 may have a thickness of about 35 micrometers to about 45 micrometers, for example, of about 41 micrometers, but no limitation is imposed on the thickness of the shock absorption layer 370. In embodiments, the shock absorption layer 370 may be omitted.

When the shock absorption layer 370 is omitted, the antireflection member 200 may be attached through an adhesive (e.g., a second adhesion layer 1020) to the window 340. When the shock absorption layer 370 is omitted, the antireflection member 200 may contact a bottom surface of the second adhesion layer 1020, and the window 340 may contact a top surface of the second adhesion layer 1020. When the shock absorption layer 370 is omitted, the black matrix 360 may be provided on the top surface of the protection layer 320, the bottom surface of the protection layer 320, the top surface of the window 340 or the bottom surface of the window 340.

Although not shown, a planarization member may be provided on a surface of the shock absorption layer 370. In embodiments, the shock absorption layer 370 may have an uneven surface, and the planarization member may be provided on one or both of top and bottom surfaces of the shock absorption layer 370 to planarize the uneven surface. Therefore, haze may be reduced or effectively prevented at the uneven surface of the shock absorption layer 370.

The upper member 300 may be combined with the antireflection member 200 through the second adhesion layer 1020. The second adhesion layer 1020 may include an ordinary adhesive or glue. The second adhesion layer 1020 may have a thickness of about 20 micrometers to about 60 micrometers, for example, of about 50 micrometers, but no limitation is imposed on the thickness of the second adhesion layer 1020.

The lower functional layers may be disposed below the display panel 100. In an embodiment, for example, the lower functional layers may include a lower protection film 400, a cushion member 500 and a lower support member (e.g., a support member). That is, a window 340, a display panel 100 and a support member may be in order along a thickness direction. Components included in the lower functional layers are not limited to those mentioned above. At least one of the components mentioned above may be omitted, and other components may be added to.

The lower protection film 400 may be combined through a third adhesion layer 1030 with a rear surface of the display panel 100. The lower protection film 400 may reduce or effectively prevent the rear surface of the display panel 100 from being scratched during fabrication of the display panel 100. The lower protection film 400 may be a colored polyimide film. In an embodiment, for example, the lower protection film 400 may be an opaque yellow film, but is not limited thereto.

The lower protection film 400 may have a thickness of about 20 micrometers to about 50 micrometers, for example, of about 32 micrometers. The third adhesion layer 1030 may have a thickness of about 13 micrometers to about 40 micrometers, for example, of about 25 micrometers. However, no limitation is imposed on the thickness of the lower protection film 400 or the thickness of the third adhesion layer 1030.

The cushion member 500 may be disposed below the display panel 100. The cushion member 500 may be located below the lower protection film 400. The cushion member 500 may protect the display panel 100 against impact transferred upwardly. The cushion member 500 may cause the electronic device 1000 to have improved impact-proof properties.

The cushion member 500 may include a barrier film 520 and a cushion layer 530. That is, the support member further includes in order from the display panel 100, a cushion layer 530, the upper plate 600 and the lower plate 700. The cushion member 500 may further include a first cushion adhesion layer 510 and a second cushion adhesion layer 540. Components included in the cushion member 500 are not limited to those mentioned above, and other components may be added to.

The first and second cushion adhesion layers 510 and 540 may include an ordinary adhesive or glue. The cushion member 500 may be attached to the lower protection film 400 at the first cushion adhesion layer 510, and may be attached to an upper plate 600 at the second cushion adhesion layer 540. The first cushion adhesion layer 510 may have a thickness of about 25 micrometers, and the second cushion adhesion layer 540 may have a thickness of about 8 micrometers. However, no limitation is imposed on the thickness of the first cushion adhesion layer 510 or the thickness of the second cushion adhesion layer 540.

The barrier film 520 may be a synthetic resin film, such as a polyimide ("PI") film, but is not limited thereto. The barrier film 520 may include, for example, at least one selected from polyimide, polyamide ("PA"), polyetheretherketone and polyethylene terephthalate ("PET").

The barrier film 520 may have a thickness of about 8 micrometers to about 40 micrometers. In an embodiment, for example, the barrier film 520 may have a thickness of about 20 micrometers.

The barrier film 520 may have a high modulus. The barrier film 520 may be provided to improve impact-proof properties of the electronic device 1000. The barrier film 520 may reduce or effectively prevent deformation of the display panel 100 to improve impact-proof properties of the display panel 100.

The cushion layer 530 may include a foam or a sponge. The cushion layer 530 may exhibit elasticity and have a porous structure.

The cushion layer 530 may include polyurethane or thermoplastic polyurethane, however, is not limited thereto, and the cushion layer 530 may include any material as long as the material is able to absorb impact.

The cushion layer 530 may be provided or formed by using the barrier film 520 as a base member. In an embodiment, for example, the cushion layer 530 may be provided or formed by coating a mixture that includes a polyurethane resin and a foaming agent on the barrier film 520, and then foaming the foaming agent. The cushion layer 530 may be directly disposed on a bottom surface of the barrier film 520. The cushion layer 530 may be in contact with the bottom surface of the barrier film 520. Alternatively, the cushion layer 530 may be attached through an adhesion member to the bottom surface of the barrier film 520.

The cushion layer 530 may have a thickness of about 80 micrometers to about 120 micrometers. In an embodiment, for example, the cushion layer 530 may have a thickness of about 100 micrometers.

One or both of the barrier film 520 and the cushion layer 530 may have a color to absorb light. In an embodiment, for example, one or both of the barrier film 520 and the cushion layer 530 may have a black color. One or both of the barrier film 520 and the cushion layer 530 may include a black-colored material. Therefore, external recognition of components disposed below the cushion member 500 may be reduced or effectively prevented. In an embodiment, for example, as one or both of the barrier film 520 and the cushion layer 530 include a black-colored material, external recognition of the upper plate 600 including metal may be reduced or effectively prevented.

The lower support member may be disposed below the cushion member 500. The second cushion adhesion layer 540 may attach the cushion member 500 to a top surface of the upper plate 600 included in the lower support member. The lower support member may support components disposed thereon in the third direction DR3.

The lower support member may include the upper plate 600 and a lower plate 700. Components included in the lower support member are not limited to those mentioned above. Other components may be added to. The lower support member may further include a support adhesion layer 1040 that is disposed between and mutually connects the upper plate 600 and the lower plate 700 to each other. The support adhesion layer 1040 may include a plurality of support adhesion patterns spaced apart from each other at the folding area FA. That is, the support adhesion layer 1040 is disconnected at the folding area FA.

The upper plate 600 may support components disposed thereon. In addition, the upper plate 600 may improve thermal radiation performance of the electronic device 1000 (e.g., heat dissipating layer).

The upper plate 600 may define an opening 601 provided in plural including a plurality of openings 601. The opening 601 may be defined at a location of the upper plate 600 which corresponds to the folding area FA. In an embodiment, for example, when viewed in plan along the first direction DR1, the opening 601 may overlap or be aligned with the folding area FA. The opening 601 may facilitate partial deformation of the upper plate 600 at the folding area FA.

For the electronic device 1000, the upper plate 600 may have a first thickness d1 less than a second thickness d2 of the lower plate 700. The first thickness d1 of the upper plate 600 may be equal to or less than about 50 micrometers. The first thickness d1 of the upper plate 600 may range from about 15 micrometers to about 50 micrometers. The thickness may be a maximum thickness or total thickness of a component, without being limited thereto.

The upper plate 600 may include a material with high stiffness. The upper plate 600 may include a metallic material whose specific strength, or strength-to-weight ratio, is equal to or greater than about 60 kilonewton meters per kilogram (kN·m/kg). In this description, the specific strength is a material's strength (force per unit area at failure) divided by its density, and it may be known that a material with a high specific strength has a high ratio of strength to weight. A metallic material included in the upper plate 600 may have a specific strength of equal to or greater than about 60 kN·m/kg, such as equal to or greater than about 100 kN·m/kg, or equal to or greater than about 150 kN·m/kg. That is, within the support member, the upper plate 600 which is closer to the display panel 100 than the lower plate 700 has a specific strength which is equal to or greater than about 60 kN·m/kg.

The upper plate 600 may include at least one selected from stainless steel, a titanium alloy, a nickel alloy, a beryllium alloy and a nickel-titanium alloy (commercially known as Nitinol). In an embodiment, for example, the upper plate 600 may include at least one of SUS304, SUS316, titanium copper, nickel copper, beryllium copper and Nitinol. That is, within the support member, the upper plate 600 which is closer to the display panel 100 than the lower plate 700 includes stainless steel, a titanium alloy, a nickel alloy, a beryllium alloy or a nickel-titanium alloy.

Referring to FIGS. 3 and 5A to 5C, the upper plate 600 included in the electronic device 1000 may include a first plate non-folding area 600A1, a plate folding area 600A2 and a second plate non-folding area 600A3 that are arranged along the second direction DR2. The plate folding area 600A2 of the upper plate 600 may overlap or correspond to the folding area FA of the electronic device 1000. That is, within the support member, the upper plate 600 includes a plate folding area 600A2 corresponding to the folding area FA of the display panel 100 and at which the upper plate 600 is foldable together with the display panel 100.

The upper plate 600 may include the first and second plate non-folding areas 600A1 and 600A3 respectively connected to the plate folding area 600A2, that at least a portion of the first plate non-folding area 600A1 overlaps or corresponds to the first non-folding area NFA1 of the electronic device 1000, and that at least a portion of the second plate non-folding area 600A3 overlaps or corresponds to the second non-folding area NFA2 of the electronic device 1000. That is, the upper plate 600 further includes a plate non-folding area which corresponds to the non-folding area of the display panel 100 and is adjacent to the plate folding area 600A2.

At least a portion of one or more of the first and second plate non-folding areas 600A1 and 600A3 may overlap the non-display area NDA of the electronic device 1000. The upper plate 600 may include a first part 600-1 that overlaps or corresponds to the first plate non-folding area 600A1, a second part 600-2 that overlaps or corresponds to the plate folding area 600A2, and a third part 600-3 that overlaps or corresponds to the second plate non-folding area 600A3. Each of the first part 600-1, the second part 600-2 and the third part 600-3 may include a solid portion of the upper plate 600.

The upper plate 600 may define a plurality of openings 601 in the second part 600-2 which corresponds to the plate folding area 600A2. At the second part 600-2, solid portions of the upper plate 600 may be spaced apart from each other to define the openings 601. The openings 601 may overlap the folding area FA of the electronic device 1000. The openings 601 may be provided in plural rows. The openings 601 may be provided in plural rows and the openings 601 in the plural rows may be staggered with each along plural columns.

In embodiments, the plurality of openings 601 may include a first opening 6011 provided in plural including a plurality of first openings 6011 arranged in a first row and a second opening 6012 provided in plural including a plurality of second openings 6012 arranged in a second row. The opening rows may extend along the first direction DR1, that is, parallel to the folding axis FX. The first row and the second row may alternate with each other within the second part 600-2.

The plurality of first openings 6011 in the first row may lengthwise extend along the first direction DR1 and may be spaced apart from each other along the first direction DR1. The plurality of second openings 6012 may lengthwise extend along the first direction DR1 and may be spaced apart from each other along the first direction DR1 and from the plurality of first openings 6011 along the second direction DR2. The plurality of first openings 6011 and the plurality of second openings 6012 may be defined alternately along the second direction DR2. Positions of the plurality of first openings 6011 and positions of the plurality of second openings 6012 may be staggered along the second direction DR2.

The upper plate 600 may include a top surface which is closest to the display panel 100 and a bottom surface which is opposite to the top surface. Each of the openings 601 may have an inner lateral surface defined by a side surface of the upper plate 600. The inner lateral surface includes a first lateral surface 601-S1 and a second lateral surface 601-S2 extended from the first lateral surface 601-S1. The first lateral surface 601-S1 may be a surface of the upper plate 600 that defines each of the plurality of openings 601. The second lateral surface 601-S2 may be a surface of the upper plate 600 that is inclined relative to the first lateral surface 601-S1 (e.g., has an inclination) and connects the first lateral surface 601-S1 to the top surface of the upper plate 600. The second lateral surface 601-S2 may be a chamfered edge surface extended between the first lateral surface 601-S1 and the top surface of the upper plate 600.

Each of the openings 601 may have a major dimension (e.g., length) and a minor dimension (e.g., width). Each of the plurality of openings 601 defined in the upper plate 600 may have a width of equal to or less than about 50 micrometers. Referring to FIGS. 5A-5C, for example, each of the plurality of openings 601 defined in the upper plate 600 may have a width of equal to or less than about 50 micrometers along the second direction DR2.

When viewed along a thickness direction (e.g., along a third direction DR3), the plurality of openings 601 may be provided or formed to completely penetrate a thickness of the upper plate 600. A penetration depth of the openings 601 may be defined by a depth of the opening relative to a total thickness of the upper plate 600, without being limited thereto. In an embodiment, for example, the plurality of openings 601 may have a penetration depth substantially the same as the first thickness d1 of the upper plate 600. The invention, however, is not limited thereto, and the plurality of openings 601 may be provided or formed to partially penetrate the first thickness d1 of the upper plate 600. In an embodiment, for example, the plurality of openings 601 may be provided or formed by half etching a thickness portion of the upper plate 600, and thus each of the plurality of openings 601 may have a groove shape that is providing by etching away to half of the first thickness d1 of the upper plate 600. The groove shape may define a recess which is open at the top surface or the bottom surface of the upper plate 600.

The lower plate 700 may be disposed facing the upper plate 600. The lower plate 700 may include plate portions (e.g., lower plates) provided in plural, and the plurality of plate portions may be disposed spaced apart from each other. That is, the lower plate 700 may be disconnected at the folding area FA. In an embodiment, for example, one plate portion may be located corresponding to the first non-folding area NFA1, and another plate portion may be located corresponding to the second non-folding area NFA2.

The plurality of plate portions may include a first lower plate 701 disposed corresponding to the first non-folding area NFA1 and a second lower plate 702 disposed corresponding to the second non-folding area NFA2. Each of the first and second lower plates 701 and 702 may extend from a respective non-folding area and into the folding area FA. In an embodiment, the support member (e.g., lower support member) includes in order from the display panel 100, the upper plate 600 which faces the folding area FA and the non-folding area of the display panel 100, has a thickness and in which are defined a plurality of openings 601 corresponding to the folding area FA and a lower plate 700 having a thickness which is greater than the thickness of the upper plate 600, the lower plate 700 including a first lower plate 701 and a second lower plate 702 each corresponding to the folding area FA and the non-folding area of the display panel 100.

The first and second lower plates 701 and 702 may be disposed spaced apart from each other at the folding area by a gap G1. The gap G1 at which the first and second lower plates 701 and 702 are spaced apart from each other may be defined to overlap the folding area FA. Although the first and second lower plates 701 and 702 are disposed spaced apart from each other at the folding area FA, the first and second lower plates 701 and 702 may be located as near to each other as maximally possible to support a region of the upper plate 600 which includes the openings 601. In an embodiment, for example, the first and second lower plates 701 and 702 may reduce or effectively prevent deformation of the upper plate 600 at the region having the openings 601 due to downward pressure.

Each of the first and second lower plates 701 and 702 may be attached through the support adhesion layer 1040 to the upper plate 600. In an embodiment, for example, the upper plate 600 may be provided with one support adhesion pattern corresponding to the first non-folding area NFA1, and may also be provided with another support adhesion pattern corresponding to the second non-folding area NFA2. In an embodiment, for example, no portion or pattern of the support adhesion layer 1040 may overlap the folding area FA. That is, the support adhesion layer 1040 is spaced apart from the folding area FA. Each portion or pattern of the support adhesion layer 1040 may have a thickness of about 8 micrometers to about 15 micrometers, for example, of about 8 micrometers, but no limitation is imposed on the thickness of the portion or pattern of the support adhesion layer 1040.

For the electronic device 1000, the second thickness d2 of the lower plate 700 may be greater than the first thickness d1 of the upper plate 600. The second thickness d2 of the lower plate 700 may be equal to or greater than about 150 micrometers. The second thickness d2 of the lower plate 700 may range from about 150 micrometers to about 300 micrometers. That is, within the support member, the thickness of the upper plate 600 is in a range of about 15 micrometers to about 50 micrometers, together with the thickness of the lower plate 700 being in a range of about 150 micrometers to about 300 micrometers.

The lower plate 700 may include a metal alloy. Each of the first and second lower plates 701 and 702 may include a metal alloy. The lower plate 700 may include a lightweight material whose thermal conductivity is high enough to secure thermal radiation properties (e.g., heat dissipation member). The lower plate 700 may include a material whose density is equal to or less than about 3 milligrams per cubic centimeter ($mg/cm^3$). In an embodiment, for example, the lower plate 700 may include at least one selected from an aluminum alloy, a nickel alloy, an aluminum-magnesium alloy and a magnesium alloy. In this description, the aluminum-magnesium alloy may indicate an alloy in which magnesium is added to aluminum. Alternatively, the lower plate 700 may include a material, other than a metal alloy, having secured lightness and thermal radiation properties. In an embodiment, for example, the lower plate 700 may include a glass fiber reinforced plastic ("GFRP"). That is, within the support member, the lower plate 700 which is further from the display panel 100 than the upper plate 600 includes an aluminum alloy, a nickel alloy, a magnesium alloy, an aluminum-magnesium alloy or a glass fiber reinforced plastic.

Although not shown, a step-difference compensation film may further be disposed between the upper plate 600 and each of the first and second lower plates 701 and 702, respectively. In an embodiment, for example, the step-difference compensation film may be provided on a region that overlaps the folding area FA. The step-difference compensation film may have an adhesive force at one surface thereof less than an adhesive force at another surface (e.g., opposing surface) thereof. In an embodiment, for example, the one surface may have no adhesive force. The one surface having no adhesive force may face the upper plate 600.

Alternatively, the step-difference compensation film may be attached below the upper plate 600. In an embodiment, for example, the lower plate 700 may be attached through a lower adhesion layer to one lower portion of the upper plate 600, and the step-difference compensation film may be attached to another lower portion of the upper plate 600. The step-difference compensation film may be attached through a compensation adhesion layer to the bottom surface of the upper plate 600. The step-difference compensation film may be a synthetic resin film. The step-difference compensation film may be provided with another compensation film on a bottom surface thereof, and thus may be attached to a lower set (not shown).

Although not shown, the electronic device 1000 may further include a thermal radiation sheet and a dielectric sheet that are disposed below the lower plate 700. The thermal radiation sheet may be a thermal conductive sheet having high thermal conductivity. In an embodiment, for example, the thermal radiation sheet may include a thermal radiation layer, a thermal radiation adhesion layer and a gap tape.

The thermal radiation layer may be attached through the thermal radiation adhesion layer to the lower plate 700. The thermal radiation layer may be encapsulated by the thermal radiation adhesion layer and the gap tape. The thermal radiation layer may be a graphite polymer film. In an embodiment, for example, the thermal radiation layer may be a graphite polyimide film. The gap tape may be attached through two thermal radiation layers that are spaced apart from each other across the thermal radiation layer. The thermal radiation adhesion layer may have a thickness of about 3 micrometers to about 8 micrometers, for example, of about 5 micrometers. Each of the thermal radiation layer and the gap tape may have a thickness of about 10 micrometers to about 25 micrometers, for example, of about 17 micrometers.

The dielectric film may be attached below the thermal radiation sheet. In an embodiment, for example, the dielectric film may be attached through the thermal radiation adhesion layer to a lower portion of the thermal radiation sheet. The dielectric film may prevent the electronic device 1000 from rattling. The dielectric film may have a thickness of about 15 micrometers, but is not limited thereto.

Although not shown, the lower plate 700 may further be provided thereunder with a lower cushion film 500-1 (see FIG. 6A) that includes a lower cushion layer. The lower cushion layer may absorb external impact applied to the electronic device 1000. That is, the support member further includes in order from the display panel 100, the upper plate 600, the lower plate 700, and a lower cushion layer.

An electronic device 1000 may include a display panel 100 which is provided thereunder with a lower support member that includes a thin upper plate having a plurality of plate openings defined at a folding region and a thick lower plate disposed below the thin upper plate. The thin upper plate may include a high-stiffness material such as a stainless steel, a titanium alloy, a nickel alloy, a beryllium alloy and a nickel-titanium alloy commercially known as Nitinol, and the thick lower plate may include a lightweight material such as an aluminum alloy, a nickel alloy, a magnesium alloy, an aluminum-magnesium alloy and a glass fiber reinforced plastic ("GFRP"). Therefore, one or more embodiment of the electronic device 1000 may reduce or effectively prevent introduction of foreign substances while securing folding, lightness and impact-proof properties.

In embodiments, for example, the electronic device 1000 may include an upper plate 600 whose thickness is small and whose stiffness is high. Therefore, not only are components such as a display panel 100 disposed on the upper plate 600 supported, but reduced sizes of a plurality of openings 601 in the plate folding area 600A2 reduces or effectively prevents introduction of foreign substances introduced into the display panel 100 through the upper plate 600. In addition, the lower plate 700 may be thicker than the upper plate 600 and may include a lightweight material, such that sagging of upper-side components such as the upper plate 600 is reduced or effectively prevented and thermal radiation properties and impact-proof properties are secured. Accordingly, one or more embodiment of the electronic device 1000 may reduce or effectively prevent introduction of foreign substances and secure folding, lightness and impact-proof properties.

Figure 6A:
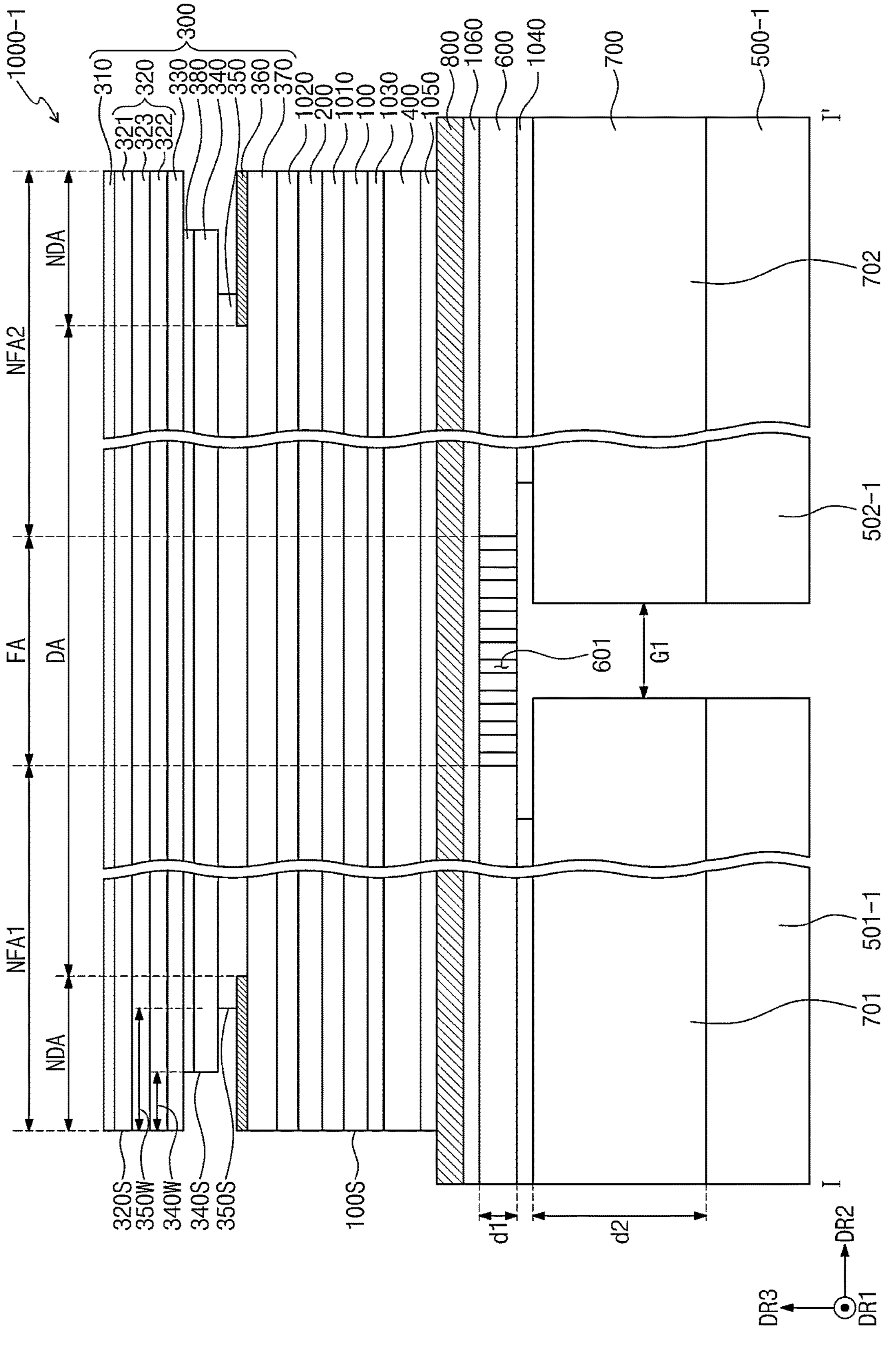
FIGS. 6A to 6C illustrate cross-sectional views showing embodiments of an electronic device.
Figure 6B:
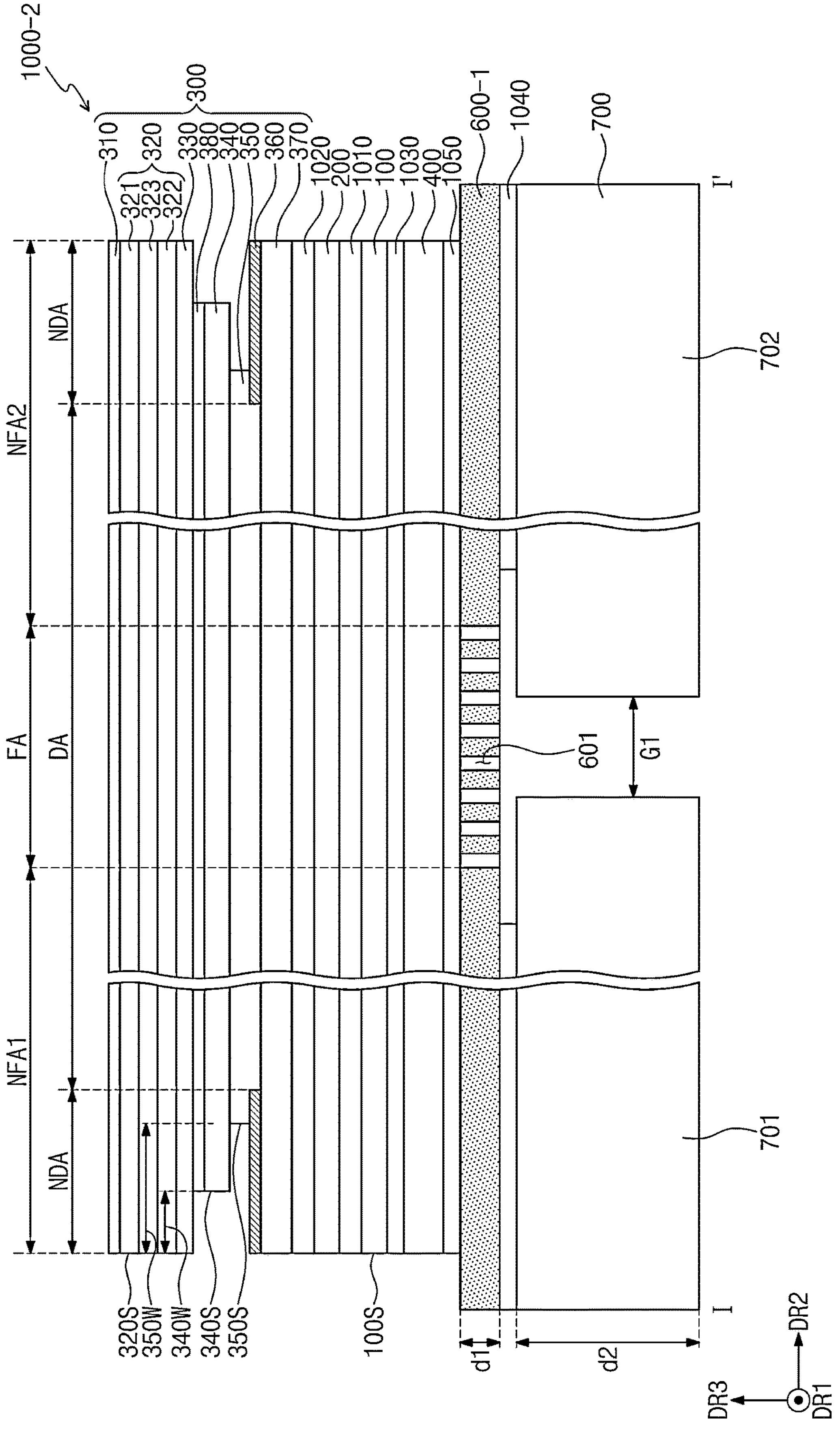
Figure 6C:
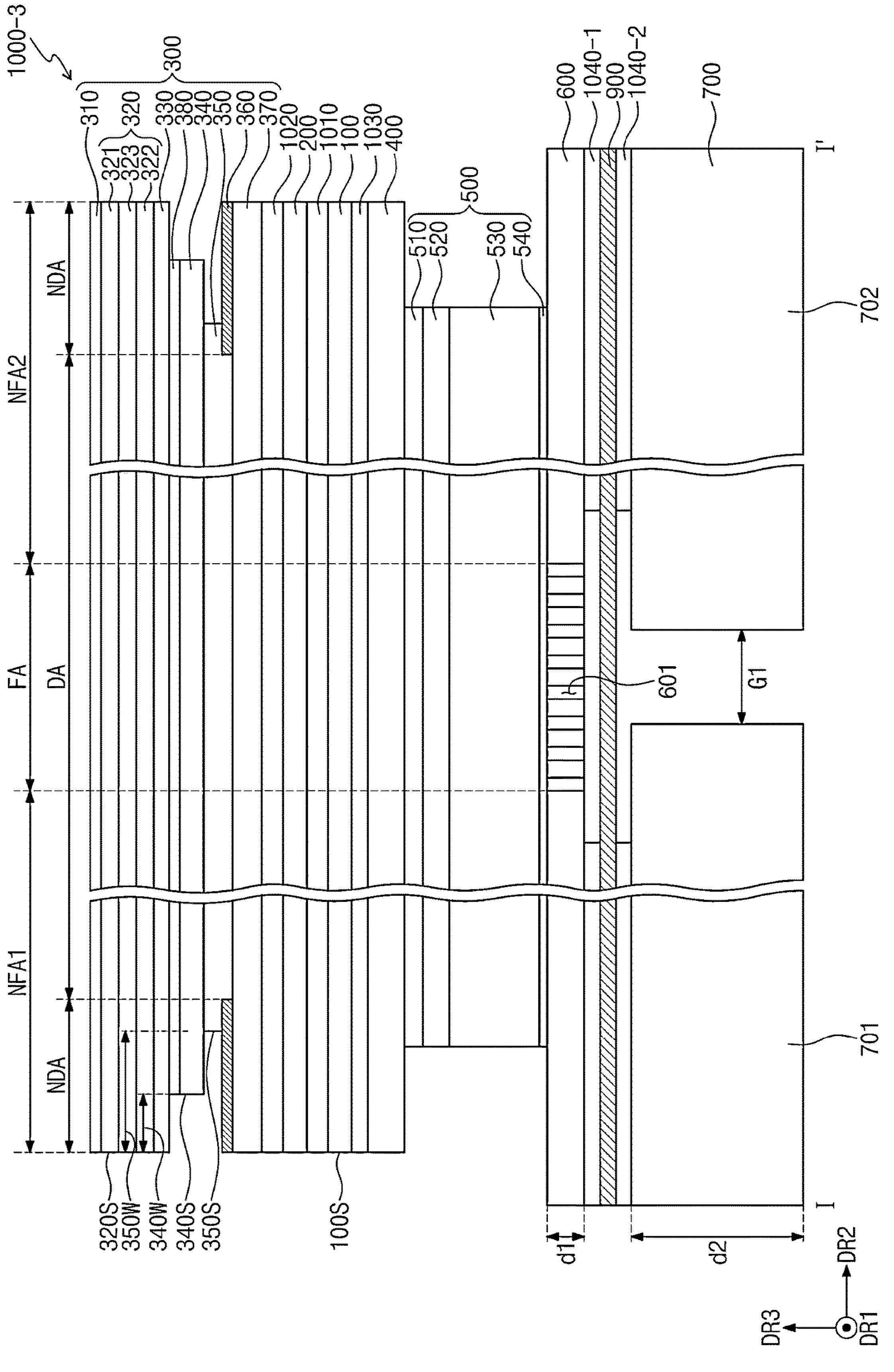

FIGS. 6A to 6C illustrate cross-sectional views showing embodiments of electronic devices 1000-1, 1000-2, and 1000-3. In explaining the electronic devices 1000-1, 1000-2, and 1000-3 with reference to FIGS. 6A to 6C, the same components as those discussed above in FIG. 3 will be allocated the same reference numerals and detailed description thereof will be omitted.

Referring to FIG. 6A, the electronic device 1000-1 may not include the cushion member 500 of the electronic device 1000 shown in FIG. 3. As the cushion member 500 is omitted, a fourth adhesion layer 1050 for attaching a planarization layer 800 to the lower protection film 400 may be provided.

The electronic device 1000-1 may further include a planarization layer 800 disposed on the upper plate 600. That is, the support member further includes in order from the display panel 100, a planarization layer 800, the upper plate 600 and the lower plate 700. The planarization layer 800 may be attached to the upper plate 600 through an additional adhesion layer 1060. Although not shown, the planarization layer 800 may be coated on the top surface of the upper plate 600 without a separate adhesion layer therebetween. In an embodiment, for example, the planarization layer 800 may be in contact with the top surface of the upper plate 600.

The planarization layer 800 may be disposed on the top surface of the upper plate 600, thereby serving to reduce surface roughness of the upper plate 600. The planarization layer 800 may be disposed on the top surface of the upper plate 600, thereby serving to improve surface quality of the upper plate 600. The planarization layer 800 may include a colored material such as a black-colored material, and may thus reduce or effectively prevent external recognition of components disposed below the planarization layer 800. In an embodiment, for example, external recognition of components such as the upper plate 600 that includes metal may be reduced or effectively prevented.

When the planarization layer 800 is a component coated on the top surface of the upper plate 600, the planarization layer 800 may be a polymer resin in which a black pigment, such as carbon black, is distributed. In an embodiment, for example, the planarization layer 800 may include a carbon black distributed in a polymeric material such as acryl resin, melamine resin, epoxy resin or urethane resin. The planarization layer 800 may be a single-layer film in which a carbon black is distributed in a polymer resin. Alternatively, the planarization layer 800 may be provided in the film shape of polyurethane or thermoplastic polyurethane, and may be attached to the upper plate 600 through the additional adhesion layer 1060.

The planarization layer 800 may have a thickness of about 5 micrometers to about 10 micrometers. In an embodiment, for example, the planarization layer 800 may have a thickness of about 8 micrometers. The additional adhesion layer 1060 may have a thickness of about 5 micrometers to about 15 micrometers. In an embodiment, for example, the additional adhesion layer 1060 may have a thickness of about 10 micrometers.

Although not shown, the planarization layer 800 may have a plurality of planarization layer openings that are defined at the folding area FA. The plurality of planarization layer openings defined in the planarization layer 800 may be provided or formed to correspond to the openings 601 defined in the upper plate 600. Therefore, when viewed in plan, the openings 601 defined in the upper plate 600 may remain open to outside the electronic device 1000-1*a* without being covered with the planarization layer 800. Thus, during a folding operation of the electronic device 1000-1, the plate folding area 600A2 of the upper plate 600 may be easily deformed with no reduction in folding properties.

A lower cushion film 500-1 that includes a lower cushion layer may be provided under the lower plate 700. The lower cushion film 500-1 may include a first lower cushion film 501-1 disposed below the first lower plate 701, and may also include a second lower cushion film 502-1 disposed below the second lower plate 702. The lower cushion film 500-1 may include a lower cushion layer and an adhesion layer which is attached to a bottom surface of the lower plate 700 through the lower cushion layer. The lower cushion layer may absorb external impact applied to the electronic device 1000-1.

Referring to FIG. 6B, the electronic device 1000-2 may not include the cushion member 500 of the electronic device 1000 shown in FIG. 3.

The electronic device 1000-2 may not include the cushion member 500, but instead include an upper plate 600-1 including a polymeric material rather than a metallic material. The polymeric material included in the upper plate 600-1 may be a material that is readily etched to form an opening 601 and that has high stiffness while securing folding properties. The upper plate 600-1 may include, for example, polyimide. The upper plate 600-1 may be a polyimide film with high stiffness. The upper plate 600-1 may be a high-stiffness polyimide film whose modulus ranges from about 1 GPa to about 15 GPa. As the upper plate 600-1 includes a polymeric material with high stiffness, the electronic device 1000-2 may secure folding properties, may have improved surface quality enough to reduce or effectively prevent external recognition of underlying components, and may be free of the occurrence of buckling.

Referring to FIG. 6C, the electronic device 1000-3 may further include a cover film 900 disposed between the upper plate 600 and the lower plate 700. In an embodiment, the plurality of openings 601 of the upper plate 600 are exposed to outside the lower plate 700 by the gap G1 at which the second lower plate 702 is spaced apart from the first lower plate 701. Here, the support member further includes in order from the display panel 100, the upper plate 600, a cover film 900 and the lower plate 700 and the cover film 900 extends across the gap G1.

The cover film 900 may be attached to the bottom surface of the upper plate 600 through a first support adhesion layer 1040-1. The first support adhesion layer 1040-1 may include an ordinary adhesive or glue. As shown in FIG. 6C, the first support adhesion layer 1040-1 may not be disposed on a region that overlaps the folding area FA on the upper plate 600 (e.g., may be spaced apart from the folding area FA). The cover film 900 may cover the openings 601 of the upper plate 600. Therefore, introduction of foreign substances into the openings 601 may be additionally reduced or effectively prevented. The cover film 900 may be attached to the top surface of the lower plate 700 through a second support adhesion layer 1040-2.

The cover film 900 may include a material whose elastic modulus less than that of the upper plate 600. The cover film 900 may include a material whose elastic modulus is equal to or less than about 30 megapascals (MPa) and whose elongation is equal to or greater than about 100%. In an embodiment, for example, the cover film 900 may include at least one selected from acryl-based resin, methacryl-based resin, polyisoprene, vinyl-based resin, epoxy-based resin, urethane-based resin, cellulose-based resin, siloxane-based resin, polyimide-based resin, polyamide-based resin and perylene-based resin. In an embodiment, for example, the cover film 900 may include thermoplastic polyurethane but is not limited thereto. The cover film 900 may be a thermoplastic polyurethane film in which a mesh pattern is provided or formed.

According to embodiments, a lower support member that includes a thin upper plate with high stiffness and a thick lower plate including a lightweight material may be provided under a display panel 100. Thus, an electronic device 1000 which reduces or effectively prevents entry of foreign substances into the display panel 100 after passing through the lower support member may be provided, while securing folding, lightness and impact-proof properties thereof, which may result in an improvement in reliability of the electronic device 1000.

Although embodiments have been described with reference to a number of illustrative examples thereof, it will be understood by those of ordinary skill in the art that various changes in form and details may be made without departing from the spirit and scope of the invention as set forth in the following claims. Thus, the technical scope of the invention is not limited by the embodiments and examples described above, but by the following claims.

What is claimed is:

1. An electronic device including:
- a folding area at which the electronic device is foldable and a non-folding area which is adjacent to the folding area along a first direction;
- a window;
- a display panel disposed below the window;
- an upper plate disposed below the display panel, the upper plate including stainless steel, a titanium alloy, a nickel alloy, a beryllium alloy or a nickel-titanium alloy; and
- a lower plate disposed below the upper plate, the lower plate including an aluminum alloy, a nickel alloy, a magnesium alloy, an aluminum-magnesium alloy or a glass fiber reinforced plastic.

2. The electronic device of claim 1, wherein
- the lower plate includes a first lower plate and a second lower plate each corresponding to the folding area and the non-folding area, and
- at the folding area, the second lower plate is spaced apart from the first lower plate by a gap along the first direction.

3. The electronic device of claim 1, wherein
- the upper plate includes a plate folding area corresponding to the folding area and at which the upper plate is foldable together with the display panel, and
- the upper plate has a plurality of openings defined in the plate folding area.

4. The electronic device of claim 1, wherein
- the upper plate has a first thickness, and
- the lower plate has a second thickness which is greater than the first thickness.

5. The electronic device of claim 4, wherein the second thickness is at least twice the first thickness.

6. The electronic device of claim 4, wherein
- the first thickness is about 15 micrometers or more, and
- the second thickness is about 150 micrometers or more.

7. The electronic device of claim 1, further comprising:
- a lower protection film disposed below the display panel; and
- a barrier layer disposed between the upper plate and the lower protection film.

8. The electronic device of claim 7, wherein the thickness of the barrier layer is about 8 micrometers to about 40 micrometers.

9. The electronic device of claim 1, further comprising:

a lower protection film disposed below the display panel; and a cushion layer disposed between the upper plate and the lower protection film.

10. The electronic device of claim 9, wherein the cushion layer comprises polyurethane or thermoplastic polyurethane.

11. The electronic device of claim 1, further comprising:

an antireflection member disposed on the display panel; and a shock absorption layer disposed between the window and the antireflection member.

12. The electronic device of claim 1, wherein the electronic device is a monitor or a tablet personal computer.

13. The electronic device of claim 1, wherein the lower plate includes a first lower plate and a second lower plate each corresponding to the folding area and the non-folding area, at the folding area, the second lower plate is spaced apart from the first lower plate by a gap along the first direction, the upper plate includes a plate folding area corresponding to the folding area and at which the upper plate is foldable together with the display panel, the upper plate having a plurality of openings defined in the plate folding area, the upper plate has a first thickness and the lower plate has a second thickness, the second thickness being at least twice the first thickness, the first thickness is about 15 micrometers or more and the second thickness is about 150 micrometers or more, and the electronic device is a monitor or a tablet personal computer.

14. An electronic device including:

a folding area at which the electronic device is foldable and a non-folding area which is adjacent to the folding area along a first direction;

a window;

a display panel disposed below the window;

an upper plate disposed below the display panel; and a lower plate disposed below the upper plate, wherein the lower plate includes a first lower plate and a second lower plate each corresponding to the folding area and the non-folding area, at the folding area, the second lower plate is spaced apart from the first lower plate by a gap along the first direction, the upper plate has a first thickness and the lower plate has a second thickness, and the second thickness is at least twice the first thickness.

15. The electronic device of claim 14, wherein the upper plate includes a plate folding area corresponding to the folding area and at which the upper plate is foldable together with the display panel, and the upper plate has a plurality of openings defined in the plate folding area.

16. The electronic device of claim 14, wherein the first thickness is about 15 micrometers or more, and the second thickness is about 150 micrometers or more.

17. The electronic device of claim 14, wherein each of the upper plate and the lower plate includes a metal.

18. The electronic device of claim 14, further comprising:

a lower protection film disposed below the display panel; and a barrier layer disposed between the upper plate and the lower protection film.

19. The electronic device of claim 18, wherein the thickness of the barrier layer is about 8 micrometers to about 40 micrometers.

20. The electronic device comprising:

a folding area at which the electronic device is foldable and a non-folding area which is adjacent to the folding area along a first direction;

a window;

a display panel disposed below the window;

an upper plate disposed below the display panel;

a lower plate disposed below the upper plate;

a lower protection film disposed below the display panel; and a cushion layer disposed between the upper plate and the lower protection film, wherein the upper plate has a first thickness and the lower plate has a second thickness, and the second thickness is at least twice the first thickness.

21. The electronic device of claim 14, wherein the electronic device is a monitor or a tablet personal computer.

* * * * *